United States Patent [19]

Kobayashi et al.

[11] Patent Number: 4,928,185

[45] Date of Patent: May 22, 1990

[54] ROTARY HEAD TYPE RECORDING/REPRODUCING METHOD AND APPARATUS FOR RECORDING AND REPRODUCING A DIGITAL AUDIO SIGNAL

[75] Inventors: Masaharu Kobayashi, Yokohama; Yukio Nishimura, Kamakura, both of Japan

[73] Assignees: Hitachi, Ltd., Tokyo; Hitachi Video Engineering, Ltd., Kanagawa, both of Japan

[21] Appl. No.: 149,171

[22] Filed: Jan. 27, 1988

[30] Foreign Application Priority Data

Jan. 30, 1987 [JP] Japan .................... 62-18400

[51] Int. Cl.$^5$ .............................................. G11B 20/12
[52] U.S. Cl. .................................... 360/19.1; 360/32; 358/343; 370/84
[58] Field of Search .................... 360/19.1, 32; 370/84; 355/5; 358/343, 310, 330

[56] References Cited

U.S. PATENT DOCUMENTS

| | | | |
|---|---|---|---|
| 4,233,627 | 11/1980 | Sugihara | 358/143 |
| 4,602,295 | 7/1986 | Moriyama et al. | 358/343 |
| 4,617,599 | 11/1986 | Noguchi et al. | 360/32 |
| 4,646,171 | 2/1987 | Odaka et al. | 360/32 |
| 4,660,103 | 4/1987 | Wilkinson et al. | 360/19.1 X |
| 4,685,004 | 8/1987 | Takahashi et al. | 360/32 |
| 4,697,212 | 9/1987 | Osawa et al. | 360/32 |
| 4,704,640 | 11/1987 | Okamoto et al. | 360/32 |
| 4,719,521 | 1/1988 | Juso | 360/32 |
| 4,751,590 | 6/1988 | Wilkinson | 360/19.1 |
| 4,757,518 | 7/1988 | Lagadec | 375/25 |
| 4,807,055 | 2/1989 | Tsunoda et al. | 360/32 |

FOREIGN PATENT DOCUMENTS 0178075 10/1986 European Pat. Off. .
3034716 9/1981 Fed. Rep. of Germany .

OTHER PUBLICATIONS

Feb., 1985, vol. 23, No. 2, IEEE Com. Mag.; p. 7-15 article by Peck, "Communications Aspects of the Compact Disc Digital Audio System".
Aug., 1986, vol. CE—32, No. 3, IEEE Transactions on Cons. Electronics; pp. 416-424, article by Aisi et al.; "Digital Signal Processing Technology for R-DAT".
NHK Giken Monthly Report 27—7, p. 282—date not clear, copy provided by applicant.
Electronic Industries Ass. of Japan Tech St. CPX—105: Consumer PCM Encoder/Decoder, Sept. 1983, copy provided by applicant.
"Digital Audio/Video Combination Recorder Using Custom Made LSI's, IC's", Arai et al., 69th Conv., 1981, May 12-15, Los Angeles, copy provided by applicant.

Primary Examiner—Aristotelis M. Psitos
Attorney, Agent, or Firm—Antonelli, Terry, Stout & Kraus

[57] ABSTRACT

A rotary-head type magnetic tape recorder for recording a video signal and an audio signal on a magnetic tape by means of a rotary head controlled on the basis of the video signal. Difference is determined between a rate at which the digital audio signal is recorded on the recording medium and which is determined by the video signal and a rate of input data determined by a sampling frequency of the audio signal for a number N of samples of the digital signal to be included within one field period synchronized with the video signal. The number of samples for one field of input data is set by preparing on the basis of the result of detection of the difference in rate a first field containing a number of samples greater than the number N within and a second field containing a number of samples smaller than the number N. Blocks for recording the PCM audio signal on the recording medium are prepared by adding a first error detection/correction code to the audio signal for every n symbols, while the symbols are imparted with amounts of delay differing from one another and subjected to diagonal incomplete interleave for thereby adding a second error detection/correction code. After addition of a block synchronizing signal, recording is performed on the tape. By adopting the variable fields, matching can be attained between the asynchronous audio and video signal fields. Reproduction capability notwithstanding of burst error is enhanced by incomplete diagonal interleave. Difference in time lag between the video signal and the audio signal involved in the reproduction thereof can be suppressed to a minimum.

10 Claims, 15 Drawing Sheets

ROTARY HEAD TYPE RECORDING/REPRODUCING METHOD AND APPARATUS FOR RECORDING AND REPRODUCING A DIGITAL AUDIO SIGNAL

CROSS-REFERENCES TO THE RELATED APPLICATIONS

This application relates to a U. S. application Ser. No. 9293 filed Jan. 30, 1987, entitled "METHOD AND APPARATUS FOR PCM RECORDING AND REPRODUCING AUDIO SIGNAL", by Masaharu KOBAYASI and Takao ARAI, (corresponding to European patent application No. 87101110.2, filed Jan. 27, 1987), and assigned to the present assignee.

BACKGROUND OF THE INVENTION

The present invention relates in general to a recording/reproduction technique for a digital audio signal such as PCM signal. In particular, the invention is concerned with a method of recording/reproducing an encoded audio signal singly or together with a video signal onto/from a magnetic tape by means of a rotary magnetic head type scanner. The invention also concerns an apparatus for carrying out the method.

In an effort to enhance the quality of audio signal which accompanies a video signal, there have been developed and adopted in practical applications recording/reproducing techniques for the PCM audio signals.

For example, an 8 mm video recorder adopts an audio PCM system. A sampling frequency of the audio PCM signal is 31.5 KHz which is two times as high as a repetition frequency of a horizontal synchronizing signal, and differs from an internationally standardized sampling frequency (32 KHz, 44.1 KHz or 48 KHz). By way of example, a sampling frequency of an audio PCM signal in a satellite broadcast is 32 KHz or 48 KHz.

On the other hand, in a MUSE system which is one of transmission systems for a high definition television system, the sampling frequency of the audio PCM signal is 32 KHz or 48 KHz. Thus, when the data sampled at the above sampling frequency are to be recorded field by field (i.e. on the field basis), the number of data per field includes a fraction, to inconvenience. In order to solve this problem, a packet transmission system having a leap field to absorb the excess has been adopted, as disclosed in NHK GIKEN MONTHLY REPORT 27-7, page 282.

In a video disk system, the PCM audio signal sampled at the sampling frequency of 44.1 KHz is recorded in the same format as that of a compact disk.

However, when the PCM signal is to be recorded by an apparatus such as a video tape recorder which records or transmits the signal discontinuously in time, a following problems arise. First, when a field frequency of a video signal is not an integer multiple of the sampling frequency of the audio signal, the problem described above is encountered in the coding. In the MUSE system proposed for solving the problem, there must be a synchronous relationship between the field frequency $f_V$ of the video signal (or a rotation frequency $f_D$ of a head scanner which rotates synchronously with the field frequency) and the sampling frequency $f_S$ of the video signal. This imposes a limitation to a system application range.

Further, when the signal recording format developed for the MUSE system is adopted in the video tape recorder system, there will arise a problem that due to insufficient capability of correcting data error brought about by injuries of tape and/or dusts deposited on the tape, adequate reliability can not be assured in the reproduction of audio signal. To cope with this problem, correcting capability of the correction code may be correspondingly reinforced while the burst error may be corrected through interleave with increased distance. In that case, however, the time required for the processing becomes as long as about 30 msec per video field due to the orthogonal interleave, involving difference in time between the video signal and the PCM audio signal, which in turn results in that viewers might feel discomfort, to another problem.

As an apparatus known heretofore for PCM recording/reproducing only the audio signal by a rotary head type VTR, there can be mentioned a Consumer-Use PCM Encoder-Decoder according to the Electronic Industries Association of Japan Technical Standard CPZ-105 (September, 1983). A typical one of the recording/reproduction apparatus based on this technical standards is shown in FIGS. 1 and 14 of an article entitled "Digital Audio/Video Combination Recorder Using Custom Made LSI's, IC's" presented at the 69th Convention 1981 May 12-15 Los Angeles AES 1791 (B-6). According to the teachings disclosed in this literature, the field frequency $f_V$ and the sampling frequency $f_S$, for example, in the NTSC system are derived from a same master clock signal in such a relationship that $f_S = 75 f_V$. Accordingly, the number of samples per field is constant at 735 samples.

An arrangement of the sampled audio signal recording/reproducing system is shown in FIG. 1 of the above-mentioned literature. From this figure, it is seen that the address of an RAM serving as an interleave memory is controlled by an address control circuit.

The proposal disclosed in the above literature is based on the assumption that the field frequency $f_V$ bears a predetermined relationship to the sampling frequency $f_S$, and no consideration is paid for the case where no correlation exists between the field frequency $f_V$ and the sampling frequency $f_S$.

In the prior art techniques described above, the sampling frequency of the video signal is not the internationally standardized sampling frequency, the number of quantized bits is small, and the sampling frequency of the audio signal and the field frequency are required to have a synchronized relationship. Thus, when a video signal from a camera and a digital signal from a compact disk (CD) system are to be recorded in combination, a great difficulty is encountered in recording them simultaneously because the sampling frequencies are different and there is no synchronous relationship between the sampling frequency and the field frequency.

Further, the audio PCM signal takes a lot of time for error correcting processing as well as for the interleave processing for dispersing data so that burst error possibly existing on the tape does not provide successive errors. Consequently, in case the video signal processed analogically and the PCM audio signal are recorded simultaneously, there arises a problem that the audio signal undergoes time lag due to the time taken for the processing for deinterleave and error detection/correction. Under the circumstance, the audio signal processing system having the processing time reduced to be as short as possible is required. Besides, for solving the problems mentioned above, the circuit scale has to be minimized with a much simplified circuit configuration.

SUMMARY OF THE INVENTION

It is therefore an object of the present invention to provide a recording/reproducing method and apparatus for a video tape recorder which can record and reproduce a digital audio signal of an internationally standardized sampling frequency together with a video signal with a video field frequency bearing no synchronous relation to the sampling frequency, and which recording/reproducing method and apparatus are capable of reducing the time required for the processing of the audio PCM signal so that the time difference due to time lag between the video and the audio signal can be reduced significantly.

Another object of the present invention is to provide a recording/reproducing method and apparatus for a video tape recorder which can accomplish the above-mentioned object without increasing the circuit scale to any appreciable degree.

In view of the above and other objects which will be apparent as description proceeds, it is taught according to an aspect of the present invention that the number of samples of audio signal to be recorded is controlled in accordance with the ratio between the field frequency and the audio signal sampling frequency. Further, in conjunction with the interleave processing, a delay processing is performed in conformance with the format for the CD system, wherein read/write addresses of a memory device storing temporarily the input audio data are so controlled that the number of audio signal samples per field can be controlled as a function of the address. With this arrangement, the aforementioned processing time as well as the time difference can be reduced to minimum.

According to another aspect of the invention, the number of audio signal samples to be recorded is controlled in accordance with the number of samples contained in one block on the basis of which the error detection/correction processing is performed, to thereby allow the system arrangement to be simplified.

According to a further aspect of the invention, a data field is constituted by a plurality of data blocks in conformance with the video field, whereby the inventive concept can be adopted commonly in both of the NTSC and the CCIR systems.

According to a feature of the present invention, the sampled input signal in the recording system is once written in a memory (RAM) as sampled data, wherein the sampled data is processed by a processor associated with the memory to be encoded into a predetermined code including an error detection/correction bits, the code thus prepared being subjected to diagonal incomplete interleave processing to be again stored in the memory. Subsequently, the encoded data are sequentially read out from the memory to form the signals to be recorded on the tape. The period for the memory writing operation is variably determined in dependence on the input signal sampling period, while the memory read-out period is variably determined in dependence on the field period of the video signal.

The number of sampled data written in the memory depends on the period of the sampled signal and the field period of the video signal. By way of example, when the period of the input sampled signal becomes shorter, the number of data is decreased correspondingly.

On the other hand, when the above-mentioned period becomes long, the number of data is decreased. Further, when the field period becomes longer, the number of data is increased.

In this manner, the number of the sampled signal data within one field can be increased or decreased in accordance with a difference in the memory address between the input data address and the output data address. More specifically, the address difference becomes greater, control may be performed such that the number of data is increased, whereby there can be realized adaptability of the variable input sampled signal period to the field period.

DESCRIPTION OF THE PREFERRED EMBODIMENTS

Now, the present invention will be described in detail in conjunction with exemplary embodiments thereof by referring to the accompanying drawings.

Figure 1:
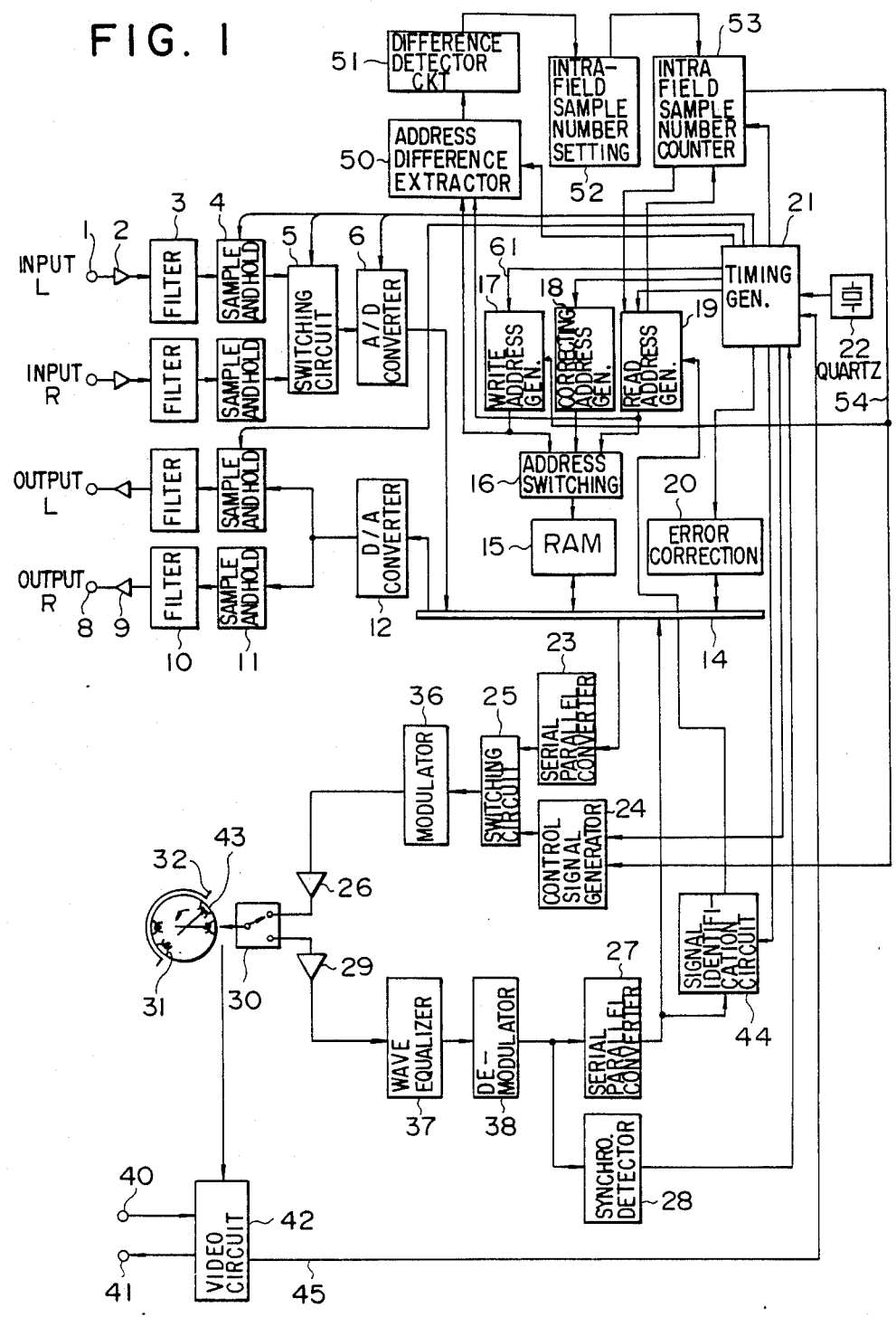
FIG. 1 is a block diagram showing a general arrangement of an audio signal recording/reproducing apparatus according to an embodiment of the present invention.

FIG. 1 shows a circuit arrangement mainly of an audio signal system in a video signal recording/reproducing apparatus of a rotary head type.

In recording operation, analog signals for left and right channels L and R are supplied to input terminals generally denoted by a reference numeral 1. The input signals are amplified by respective amplifiers 2 to a predetermined level and thereafter undergo band limitation through associated filters 3, to be subsequently sampled by respective sampling circuits 4. The sampled input signals are sequentially and alternately supplied to an analog-to-digital (A/D) converter 6 by way of a switching circuit 5 to be converted into a digital signal. The digital signal resulting from the A/D conversion is written into a RAM (Random Access Memory) 15 through a bus line 14. Address generator circuits 17 to 19 cooperate with an address switching circuit 16 to perform an address control for the RAM 15 so the audio signal is arranged in accordance with a predetermined format with an error correction codes being added. The addition of the error correction codes is performed by means of an error correcting circuit 20. After the arrangement of the audio signal and addition of the correction code, the data thus prepared are read out sequentially from the RAM 15. In this connection, a read address generator circuit 19 is so controlled that the number of the audio signal samples in one field as counted by an intra-field sample number counter circuit 53 becomes equal to the number of samples which is set in an intra-field sample number setting circuit 52 in accordance with a signal outputted from a difference detection circuit 51 and representative of difference between the write address and the read address, which difference being determined by an address difference extracting circuit 50. The signals read out from the RAM 15 are converted into serial signals through a parallel/serial conversion circuit 23. In the case where the number of audio signal data within one field is less than a predetermined value, signal other than the audio signal and a code identifying the audio signal or the other signal as well as a control signal such as a synchronizing signal and others are added in succession to the audio signal through cooperation of a control signal generating circuit 24 and a switching circuit 25, to thereby prepare a data signal of a predetermined format, which is then modulated by a modulator circuit 36. The output signal from the modulator circuit 36 is then amplified to a predetermined level by a recording amplifier 26 to be recorded in a surface layer or inner layer of a magnetic tape 32 by means of a recording rotary magnetic head 31. A switching circuit 30 serves to change over the operation between the recording mode and the reproducing mode. A timing generator circuit 21 serves to generate timing signals for controlling various parts of the apparatus on the basis of a clock signal produced by an oscillator circuit 22.

On the other hand, in the reproducing mode of operation, the switching circuit 30 is changed over to the reproducing mode position, whereby the signal picked up by the rotary audio head 31 is amplified by a reproducing amplifier 21 to a predetermined level to be subsequently shaped by a waveform equalizer circuit 37. The waveform-equalized signal outputted from the circuit 37 is demodulated and converted to a digital signal by a demodulator circuit 38. The digital signal resulting from the demodulation is supplied to a synchronization detector circuit 28 for detecting the synchronizing signal. At the same time, the digital signal is fed to a serial/parallel converter circuit 27 to be converted to a parallel signal. The detected synchronizing signal is made use of in reconstitution of data. On the other hand, the parallel signal undergoes decision processing in a signal decision circuit 44 for identifying discriminatively the audio signal or the other signal, wherein only the audio signal is stored in the RAM 15. Further, data containing the audio signal and the other signal are also stored in the RAM 15 for the purpose of rearrangement of data and the error correction in the error correcting circuit 20. The audio signals read out from the RAM 15 after having undergone the data rearrangement and the error correction, as occasion requires, are supplied to a D/A converter 12 over the bus line 14 to be thereby converted into analog signals sequentially. The analog signals thus obtained are resampled on the channel-by-channel basis by a sample and hold circuit 11. The analog signals re-sampled for both channels are sent out from respective output terminals 8 after having passed through associated filters 10 and amplifier circuits 9, respectively.

In the recording mode of operation, the video signal is supplied to an input terminal 40 to be converted to a predetermined signal by a video circuit 42 for being subsequently recorded on the tape 32 by a rotary video head 43. Upon reproduction, the signal reproduced by the rotary video head 43 is converted to a predetermined signal by the video circuit 42 to be sent out from an output terminal 41.

Figure 2:
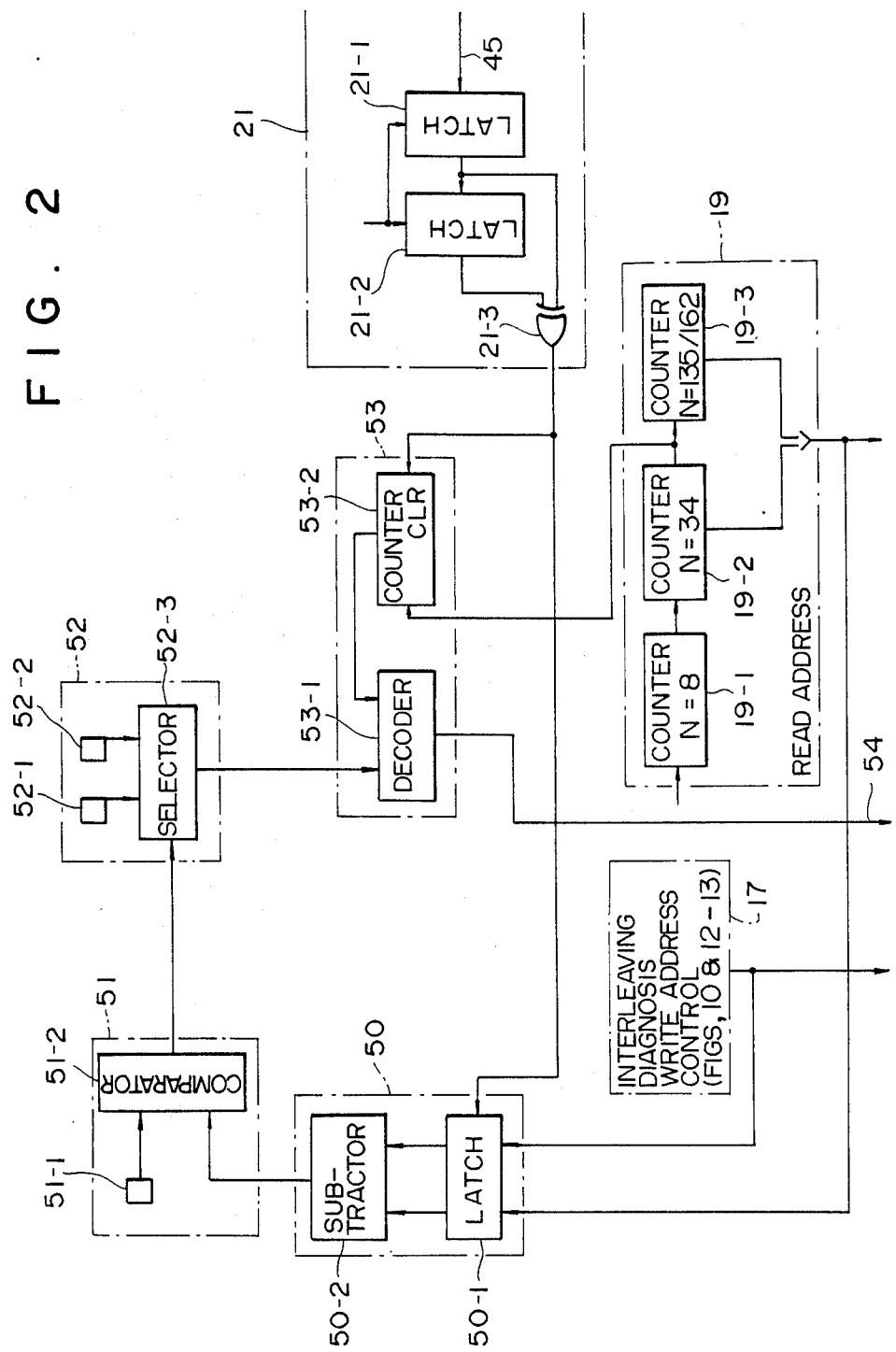
FIG. 2 is a block diagram showing a configuration of a RAM write/read address circuit according to an embodiment of the invention.

Next, referring to FIG. 2, description will be made of the address control circuit for the read/write operation to be performed for the RAM 15 in the recording mode. In FIG. 2, the read address circuit 19 is constituted by a counter 19-1 for dividing a master clock frequency by a factor of 8, a counter 19-2 for dividing the output frequency of the counter 19-1 by a factor of 34, and a counter 19-3 for dividing the frequency output of the counter 19-2 by a factor of 135 in the case of the video tape recorder (VTR) of the 525 lines/60 fields (NTSC) standard or by a factor of 162 in the case of VTR of the 625/50 (PAL) standard.

The address difference extracting circuit 50 includes a latch 50-1 which operates to latch the output of the write address circuit 17 and the output of the read address circuit 19 at a time point of transition of a head switching signal 45 derived through an Exclusive-OR gate 21-3. The write address circuit designed for performing diagonal interleave operation will be described in detail hereinafter in conjunction with FIG. 10 and FIGS. 12 to 13. The outputs of the latch 50-1 are applied to the inputs of a subtraction circuit 50-2, where the read address value is subtracted from the write address value, the resulting difference being applied to an input of a comparator 51-2 having the other input to which an output signal of a reference value circuit 51-1 is applied. The comparator 51-2 decides whether the difference value is greater or smaller than the output value of the circuit 51-1. The intra-field sample number counter circuit 52 controls a selector 52-3 to select a counter decode value 52-1 or a counter decode value 52-2 in dependence on the output signal of the comparator 51-2 to thereby set the intra-field sample number (i.e. the number of samples within one field). More specifically, the decoder 53-1 is so controlled that when the output value of the subtraction circuit 50-2 is greater than that of the reference value circuit 51-1, the number of audio data samples is increased, while the latter is decreased when the output value of the subtraction circuit 50-2 is smaller than that of the reference value circuit 51-1. The intra-field sample number count circuit 52-3 responds to the output value of the counter 53-2 upon coincidence with the decode value selected by the selector 52-3 for producing a control signal 54 which controls the control signal circuit 24 (FIG. 1) such that "0" is recorded in the relevant area of the control code for the audio signal while placing "1" for the data other than the audio signal.

Figure 3:
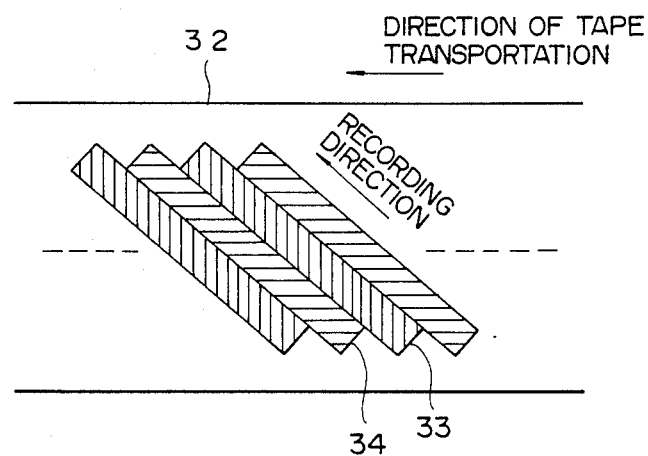
FIG. 3 is a diagram illustrating a record pattern on a magnetic tape.

FIG. 3 is an illustration of a recording pattern on a magnetic tape. As will be seen, the magnetic tape 2 is recorded alternately with plus (+) azimuth tracks 33 and minus (−) azimuth tracks 34. In each track, both video signal and audio signal may be recorded in a surface layer or alternatively they may be recorded separately in the surface layer and inner layer, respectively. As the further alternative, only the audio signal may be recorded in the surface layer singly or in both the surface layer and inner layer. The recording technique of this concern is disclosed in Takaharu NOGUCHI et al U.S. patent application Ser. No. 800,147 (European patent application No. 85114778.5) in which some of the present inventors are involved.

Now, description will be made of data array or arrangement in the case where a video tape recorder (VTR) is employed as a PCM signal recording/reproducing apparatus of rotary head type.

Assuming that the audio signal is recorded at a sampling frequency of 48 KHz with 16 quantizing bits in the VTR, the number of samples will be then given by a fractional number of 800.8 samples per field because the cylinder rotation number in the VTR is about 1798.2 rpm. In this case, the sample number in one field (i.e. intra-field sample number) is set equal to, for example, 800 or 801 or other number given by an integer, wherein some measures are taken for coordinating the data numbers over a plurality of fields.

Figure 4:
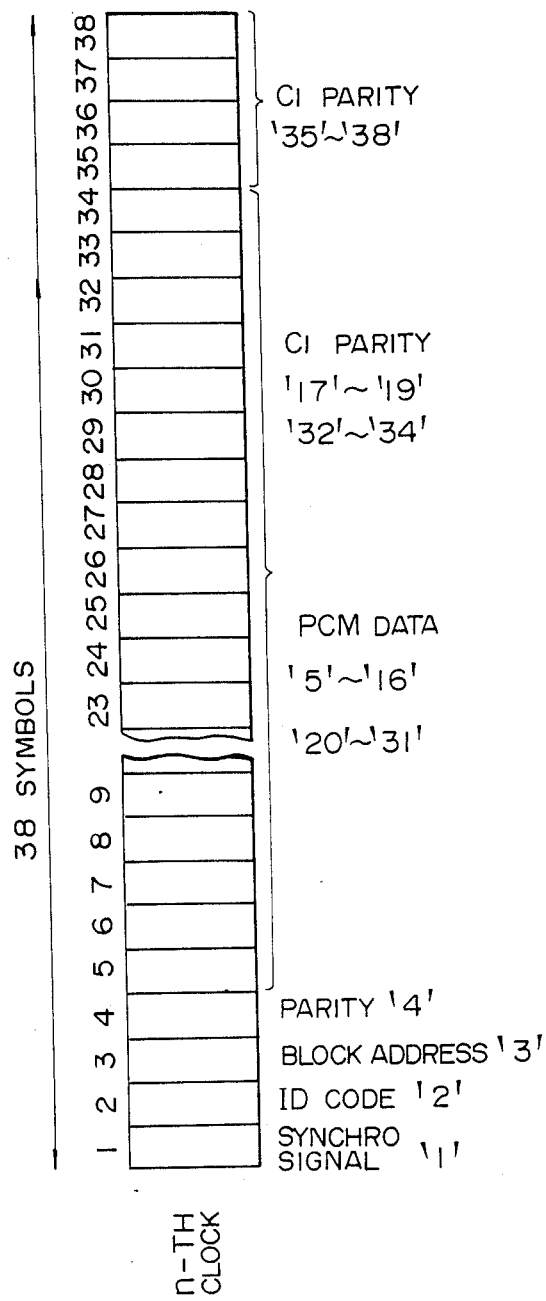
FIG. 4 is a schematic diagram showing a data structure within one block.

Next, a data structure in which the data array or arrangement within one field conforms to the format adopted in a compact disk (CD) system will be described. FIG. 4 shows a data structure for a PCM signal in which each word consisting of 16 bits for two channels is divided into two symbols each of eight bits and which includes twenty four symbols allocated for data, ten symbols for error detection/correction parities, one symbol for the synchronizing signal, one symbol for the ID code containing a control signal for indicating the type of the data, one symbol for the block address and the remaining symbol for the parity, wherein the above-mentioned symbols of 38 in total number constitute one block. In the case of the 525/60 system (NTSC standard), 136 blocks can be recorded on each track. In the 625/50 (PAL) system, 162 blocks of data are recorded on each track. Further, addition of error correction code and data dispersion corresponding to, for example, R-DAT are made so that error correction can be performed even when a significant burst error should occur. By way of example, the data dispersion may be accomplished such that the data bearing even numbers are recorded in precedence to the odd-numbered data.

In the foregoing embodiments, by setting the intra-field data amount such that difference thereof relative to 800.8 samples is large, significant errors in the period of the vertical synchronizing signal of the VTR and the sampling frequency can be coped with.

Besides, smooth control can be performed by controlling the number of samples within one field in dependence on magnitude of the output of the address difference extracting circuit 50.

The foregoing description has been made on the assumption that the invention is applied to the 525/60 (NTSC) system. It should however be understood that the similar advantageous effects can be obtained in the case where the invention is applied to the 625/50 (PAL) system.

In the case of the 625/50 (PAL) system, the number of samples within the period of one field is equal to 960. Accordingly, by providing the field containing the 950 or less samples and the field containing 961 or more samples, the aimed control can be accomplished.

Although it has been assumed in the foregoing description that the sampling frequency is 48 KHz, it will be readily understood that the aimed control can be accomplished by controlling the number of samples within one field through similar procedure even when the sampling frequency is 44.1 KHz or 32 KHz or of other values. By way of example, assuming that the sampling frequency is 44.1 KHz in the case of the 525/60 (NTSC) system, the number of the samples within the period of one field amounts to about 735.7. Accordingly, the aimed control can be accomplished by providing the field containing 735 or less samples and the field containing 736 or more samples. In the 625/50 system, the number of samples within one field is 882. Accordingly, the aimed control can be accomplished by providing the field containing 881 or less samples and the field containing 883 or more samples. Similarly, in the case where the sampling frequency is 32 KHz in the 525/60 (NTSC) system, the number of samples within one field is about 533.9. Accordingly, the control can be realized by providing the field containing 533 or less samples and the field containing 534 or more fields. On the other hand, when the sampling frequency is 32 KHz in the 625/50 (PAL) system, the number of samples within one field amounts to 640. Accordingly, the aimed control can be accomplished by providing the field containing 639 or less samples and the field containing 641 or more samples.

Now, description will be turned to an embodiment of the invention according to which the audio signal is recorded/reproduced with a period differing from that of the vertical synchronization for the video signal.

Figure 5:
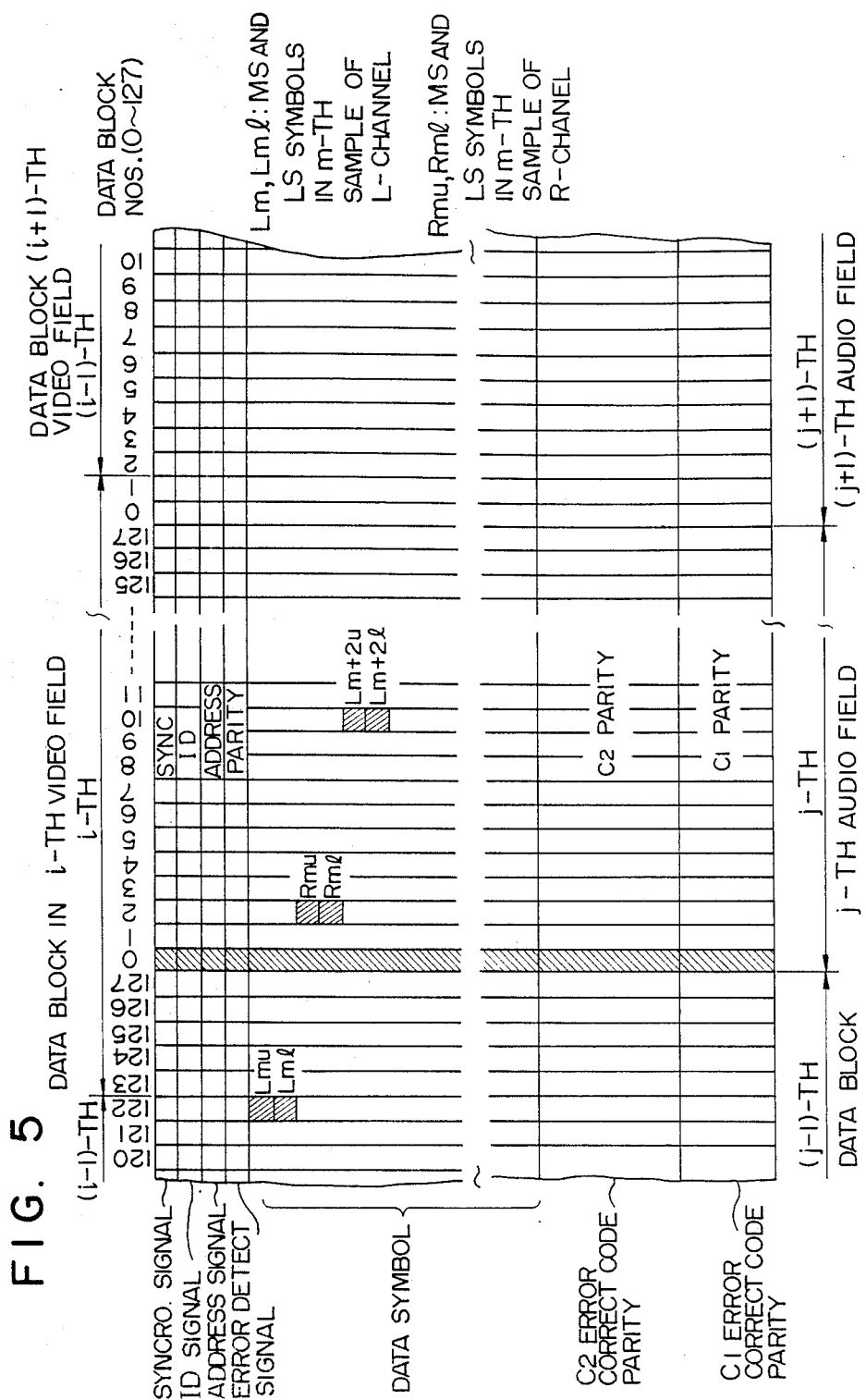
FIG. 5 is a diagram showing a data frame format according to an embodiment of the invention.

FIG. 5 shows an example of data frame, in which one data block is constituted by 38 symbols, as in the case of FIG. 4. With 125 data blocks of this structure, one data frame (or audio frame) is realized. It is assumed, by way of example only, that block addresses are represented by "0" to "127" (i.e. data block numbers "0" to "127" are allocated to the data blocks) by using seven less significant bits except for the most significant one bit. In FIG. 5, there are shown the (j−1)-th, j-th and the (j+1)-th audio fields.

Audio data are recorded and/or reproduced in division within the video field on the 135 data block basis asynchronously with the data block numbers or the audio fields. FIG. 5 shows the (i−1)-th, the i-th and the (I+1)-th data blocks divided as mentioned above within the video field. The PCM signal of 16 bits is each divided into two symbols consisting of eight more significant bits and eight less significant bits, respectively, wherein the m-th audio signals in L- and R-channels are represented by $L_{mu}$, $L_{ml}$, $R_{mu}$, $R_{ml}$, respectively, where u and l indicate upper and lower symbols, respectively. These symbols may be dispersed so as to be placed at predetermined positions in the individual blocks, as shown in FIG. 5. By way of example, the symbols $L_{mu}$ and $L_{ml}$ may be positioned in the same block while the symbols $L_{m+2u}$ and $L_{m+2l}$ may be placed in a block distanced from the block containing the symbols $L_{mu}$ and $L_{ml}$ by 16 blocks. The intra-block position of $C_2$ parity may lie in the data symbol, as in the case of the compact disk (CD) system, to similar effects. On the other hand, the even-numbered symbols and the odd-numbered symbols of the PCM signal may be positioned in the blocks separated from each other with a greater distance. With this arrangement, the effect of concealment can be enhanced in the case where correction is impossible for the burst error of greater length.

An example of the data dispersion will be described by referring to FIG. 6. The odd numbered data of the digitized audio signal such as, for example, data $L_{m+2n+1}$ and $R_{m+2n+1}$ are delayed, respectively, by a time corresponding to 12 blocks, and subsequently data of more significant symbols such as, for example, $L_{m+n,u}$ and $R_{m+n,u}$ are delayed by a time corresponding to four blocks, respectively.

These data are encoded by error correction codes (30, 24, 7) each constituted by a Reed-Solomon code and having an intra-code distance of "7" equivalent to a rotary head type digital audio tape (R-DAT) system (encoded in C2), whereupon data are so scrambled that the even-numbered data precede to the odd-numbered data.

Figure 7:
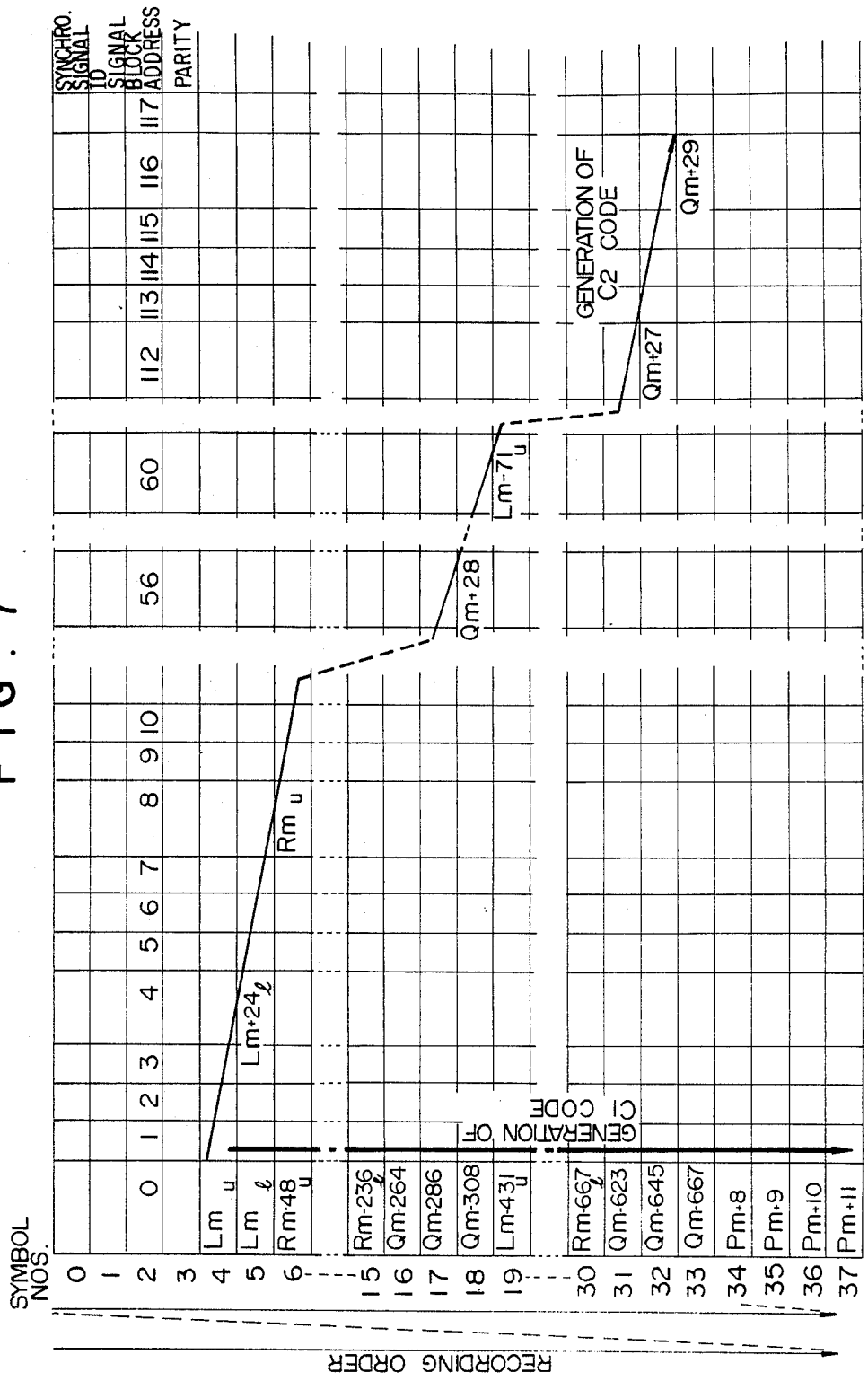
FIG. 7 is a diagram showing a data array (disposition) resulting from the interleave processing.

Subsequently, these data are delayed by four blocks, respectively, and encoded by other error correction codes (34, 30, 5) constituted by the Reed-Solomon codes and having an intra-code distance of "5" equivalent to R-DAT (encoding in C1). The data array resulting from the error correction coding mentioned above is illustrated in FIG. 7.

As a scheme for recording and reproducing the audio data on the 128 block basis asynchronously with the period of vertical synchronization for the video signal, there can be conceived a system described below. When the repetition frequency of the vertical synchronizing signal of the video signal is represented by $f_V$ with the sampling frequency of the audio signal being represented by $f_S$, the number of samples of the audio signal for 135 blocks which are to be recorded on one track constituting one field of the video signal is given by $$f_S/f_V = 48000/(60/1.001) = 800.8 \text{ (samples)}$$

in the case of the 525/60 standard VTR where the audio signal sampling frequency ($f_S$) is 48 KHz and the repetition frequency ($f_V$) of the vertical synchronizing signal is (60/1.001) Hz. Accordingly, the number of audio signal samples which have to be recorded on the 128 data block basis is derived as follows:

$$128/135 \times 800.8 = 759.2777 \ldots \text{ (samples)}$$

On the assumption that the 128 data blocks constitute one data field, there are provided E-sample (Excess sample) data fields each containing the audio samples in a number greater than 759.277 . . . and D-sample (Diminish sample) data fields each containing the audio samples in a number smaller than the above value, wherein these data fields of two types are recorded under the control of the intra-field sample number counter circuit 53 shown in FIG. 1.

In this case, six samples of PCM audio signals for two channels each consisting of 16 bits can be recorded in the data region of 24 symbols for each block, as will be seen in FIG. 4, by setting the number of data at a value equal to an integral multiple of "6", i.e.

E=6.a (samples)

D=6.b (samples), (where a and b are positive integers)

the write address control circuit 17 shown in FIG. 1 can be realized in a simplified circuit configuration, because the access times may be equal to an integral multiple of the block number.

Further, by setting the audio signal sampling period such that the differences thereof relative to the data numbers E and D are substantially same, the capability of accommodating variations in the audio sampling period as well as in the vertical synchronization period of the video signal can be made equal in either positive or negative direction.

More specifically, in the positive direction, variation up to $$\frac{E - 128f_S/135f_V}{128f_S/135f_V}$$

can be allowed, while in the negative direction, variation of magnitude up to $$\frac{D - 128f_S/135f_V}{128f_S/135f_V}$$

is permissible.

Now, it is assumed that the audio signal sampled at the frequency of 48 KHz is to be recorded in the VTR or the 525/60 (NTSC) standard. When the data numbers E and D are, respectively, 768 samples and 750 samples, the ratios of differences relative to the audio sample number of 759.277 . . . which must be recorded in one data field are, respectively, about +1.15% and −1.22%. The difference on this order can be tolerated so far as the precision of the vertical synchronizing frequency of the VTR and the audio signal sampling frequency is comparable to that of quartz oscillator, e.g. in the order of $10^{-5}$.

There can be recorded in one data field 768 samples of the audio signal data for one channel at maximum. In this connection, there is conceivable a method according to which a number of other audio samples, e.g. 750 samples of other audio signal data can be recorded starting from, for example, the (m+18)-th location. In other words, it is possible to utilize the data area between the m-th and the (m+17)-th locations as the area for the other data than the audio signal or as the subcode area. As another example, the audio signal data may be sequentially recorded starting from the zero-th location, wherein the remaining area covering from the (m+750)-th location to the (m+767)-th location can be utilized as the area for the other data than the audio signal or the subcode region.

On the other hand, when the audio signal data sampled at the frequency of 48 KHz are to be recorded in the VTR of the 625/50 (PAL) standard, the number of audio signal samples per video field is $$f_S/f_V = 48000/50 = 960 \text{ (samples)}$$

When the number of data blocks to be recorded on the video field basis are, for example, 162 blocks, the number of audio signal samples per data field is $$128/162 \times 960 = 758.51 \ldots \text{ (samples)}$$

When two types of data fields containing more than 758.51 . . . audio samples, say 768 samples, and less than 758.51 . . . samples, say 750 samples, are prepared, respectively, the margin with which the 758.51 . . . samples can be accommodated are approximately between +1.25% and −1.12% in ratio.

Similarly, when the audio sampling frequency $f_S$ is 32 KHz, the number of audio samples which can be recorded within one video field in the VTR of the 525/60 (NTSC) standard is given by $$f_S/f_V = 32000/60/1.001 = 533.86 \text{ (samples)}$$

Accordingly, the number of samples to be recorded within one data field is $$128/135 \times 533.86\ldots = 506.18 \text{ (samples)}$$

When the recording is performed with the data fields containing 512 samples and 498 samples, respectively, the permissible difference of the sample number lies approximately between $+1.94\%$ and $-1.62\%$ in ratio.

On the other hand, in the case of VTR of the 625/50 standard, the number of audio data samples which are to be recorded within one data field is $$128 \times 32000/162 \times 50 = 505.67\ldots \text{ (samples)}$$

Accordingly, by preparing the data field capable of recording 512 samples and 498 samples, respectively, the ratios of difference relative to the abovementioned sample number of $505.67\ldots$ lie approximately between $+2.04\%$ and $-1.52\%$.

As will be appreciated from the foregoing description, it is possible to record and reproduce the audio signal asynchronously with the vertical synchronization period of the video signal by providing (preparing) two or more data fields containing the samples in numbers greater and samller than the ratio of the video vertical synchronizing period $T_V$ to the audio signal sampling period $T_S$ (i.e. $T_V/T_S$), respectively, and controlling the value to be selected for each data field in dependence on the ratio of the video vertical synchronizing period $T_V$ to the audio sampling period $T_S$.

Further, by equalizing the number of audio data per data field, simplification of the circuit configuration can be accomplished in both the systems of the 525/60 (NTSC) standard and the 625/50 (PAL) standard.

Same holds true in the other system standardized internationally in which the audio sampling frequency of 44.1 KHz is used. In other words, the asynchronous audio recording/reproduction can be performed by providing the data fields of capacities greater and smaller than the amount of audio data to be recorded in one data field, respectively, and controlling the data field in accordance with the ratio of the video vertical synchronizing period to the audio sampling period.

According to another embodiment of the invention, the following recording/reproduction method may also be adopted.

Let's represent the repetition frequency of the video vertical synchronizing signal by $f_V$ and the audio signal frequency by $f_S$. Assuming, for example, that the number of audio signal data blocks to be recorded on one track constituting one field of the video signal is 162, the number of samples for one channel of the audio signal is given by $$f_S/f_V = 48000/50 = 980 \text{ (samples)}$$

in the case of VTR of the 625/50 (PAL) standard where the audio signal sampling frequency $f_S$ is 48 KHz. Accordingly, the number of samples to be recorded on the 128 data block basis is given by $$128/162 \times 960 = 758.51\ldots \text{ (samples)}$$

On the condition that 128 data blocks constitute one data field, there are prepared an E-sample data field containing E samples in a number where E is greater than $758.51\ldots$ and a D sample data field containing D samples where D is smaller than $758.51\ldots$. In this case, by preparing the abovementioned E and D data fields in numbers x and y, respectively, so that the following condition is satisfied on an average by repetition of these fields, $$\frac{128}{162} \times 960 = \frac{Ex + Dy}{x + y}$$

synchronization can be achieved. In other words, the synchronization can be accomplished by repeating the E sample data field by x times and D sample data field by y times, respectively, with a period corresponding to $(x+y)$ data fields.

By way of example, let's assume that E is selected equal to 768 (samples) and D is 750 (samples). When the repetition numbers x and y are selected equal to 115 and 128, respectively, the number of the samples in one data field averaged over 343 data fields is given by $$\frac{768 \times 115 + 750 \times 128}{115 + 128} = 758.51 \text{ (samples)}$$

whereby synchronization can be realized.

On the other hand, when 135 data blocks are recorded within one video vertical synchronization period in the 525/60 (NTSC) standard VTR, the number of audio signal samples for one channel is given by $$f_S/f_V = 48000/60/1.001 = 800.8 \text{ (samples)}$$

where $f_S$ represents an audio signal sampling frequency of 48 KHz and $f_V$ represents a frequency of the video vertical synchronizing signal in the 525/60 standard VTR.

Accordingly, the number of the audio samples to be recorded in one data field is $$128/135 \times 800.8 = 759.27\ldots \text{ (samples)}$$

Thus, by preparing the E sample data field (where E represents the number of samples greater than $759.27\ldots$) and the D sample data field (where D represents the number of samples smaller than $759.27\ldots$), and repeating $(x+y)$ data fields (where x represents the number of the E sample data fields with y representing that of the D sample data fields) so that the average data number in one data field satisfies the following condition:

$$\frac{128}{135} \times 800.8 = \frac{Ex + Dy}{x + y}$$

synchronization can be realized. In other words, the synchronization can be accomplished by determining the values of E, x, D and y which satisfy the above-mentioned condition. It is however noted that difficulty may be encountered in determining the values of E, D, x and y in some cases. To evade such difficulty, it is taught that the audio signal sampling frequency $f_S$ is changed by $\Delta f_S$ so that the number of the audio samples within one video vertical synchronization period is given by $$(f_S + \Delta f_S)/f_V \text{ (samples)}$$

Then, the number of the samples to be recorded in one data field is:

$$128/135 \times (f_S + \Delta f_S)/f_V \text{ (samples)}$$

By preparing E' sample data fields (where E' represents the number of samples in one field greater than the number given by the expression mentioned just above) in a number of x' and D' sample data fields (where D' represents the number of samples in one field smaller than the above-mentioned number) in a number of y' and selecting the values of E', D'. x' and y' so as to satisfy the following condition:

$$\frac{128(f_S + \Delta f_S)}{135 f_V} = \frac{Ex' + D'y'}{x' + y'}$$

synchronization can be accomplished.

Figure 8:
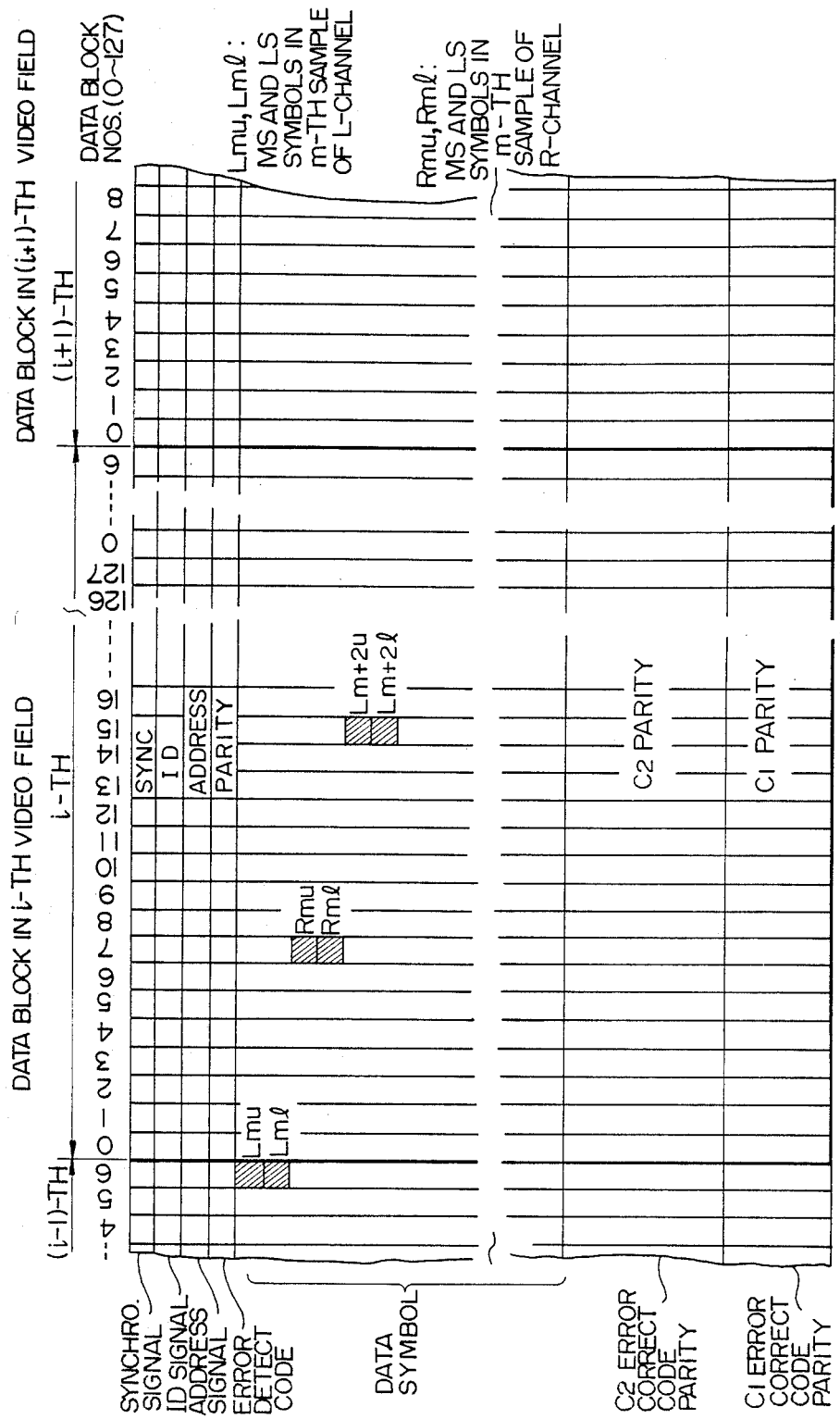
FIG. 8 is a diagram showing a data frame according to another embodiment.

FIG. 8 shows another example of the data frame which is destined for recording/reproducing the audio signal in the same field period as the video synchronizing period.

Figure 9:
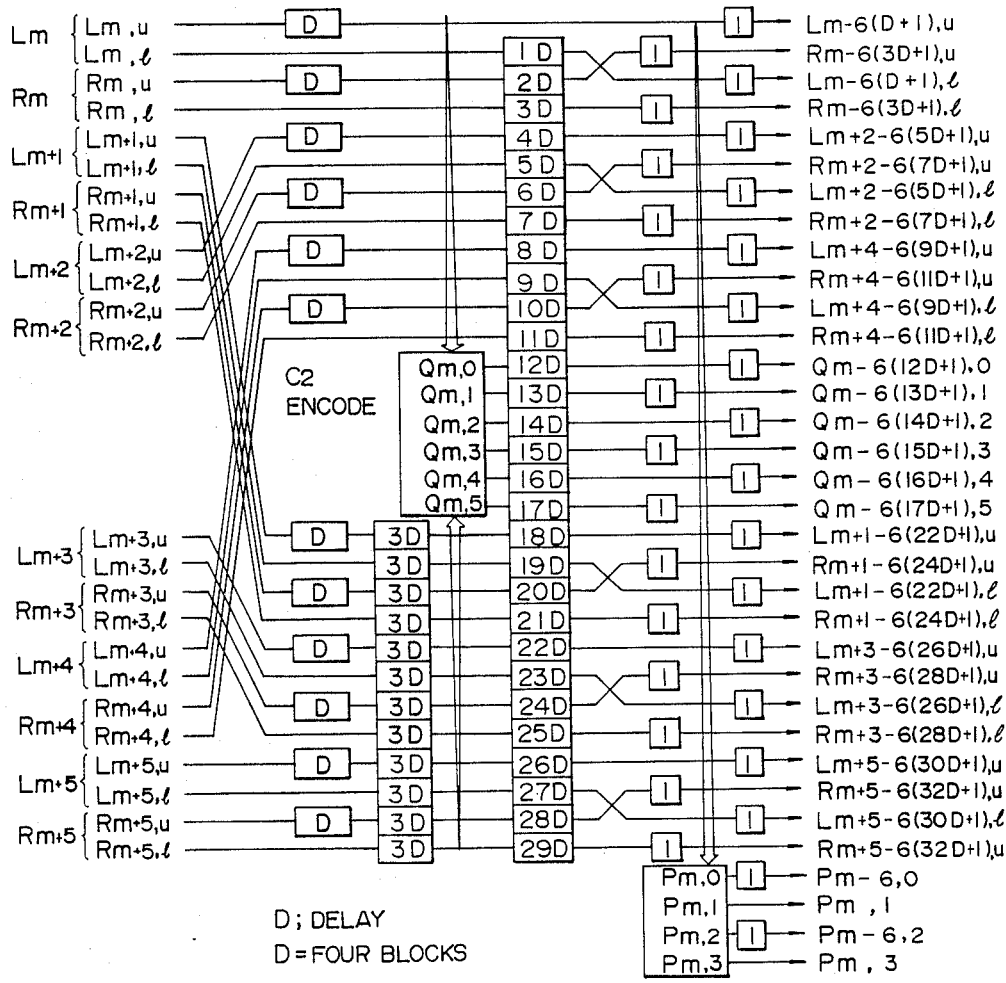
FIG. 9 is a block diagram showing the data interleave processing according to a further embodiment of the invention.

FIG. 9 shows another example of the data dispersion, according to which the C2 code is located at the center, whereby the even-numbered audio data and the odd-numbered audio data are positioned with a distance therebetween. With this array, the error correcting capability can be enhanced. Further, because the data are scrambled upon recording, successive errors over two symbols can be reduced to one symbol error.

Figure 10:
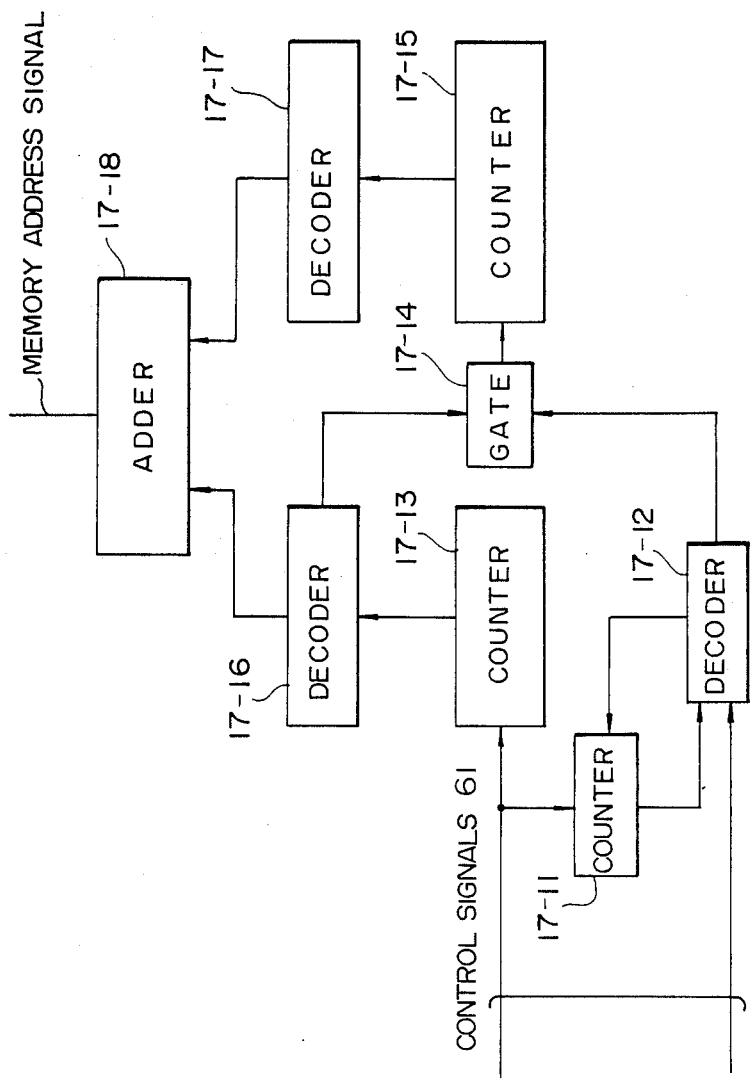
FIG. 10 is a block circuit diagram showing a write address generating circuit according to the invention.

FIG. 10 shows an exemplary embodiment of the write address generating circuit for generating address for recording the A/D-converted audio data in the RAM 15. The following description is directed to this write address generating circuit.

The timing generating circuit 21 shown in FIG. 1 generates an address clock for each symbol of audio data divided into the more significant bit data and the less significant bit data and a control signal for controlling the number of audio data to be recorded in one data field. Referring to FIG. 10, a decoder 17-16 decodes the output of a block counter 17-13 destined for counting the number of audio samples in one block with the aid of the aforementioned address block, to thereby generate the relative address for the write operation. This will be described below in more detail.

Figure 11:
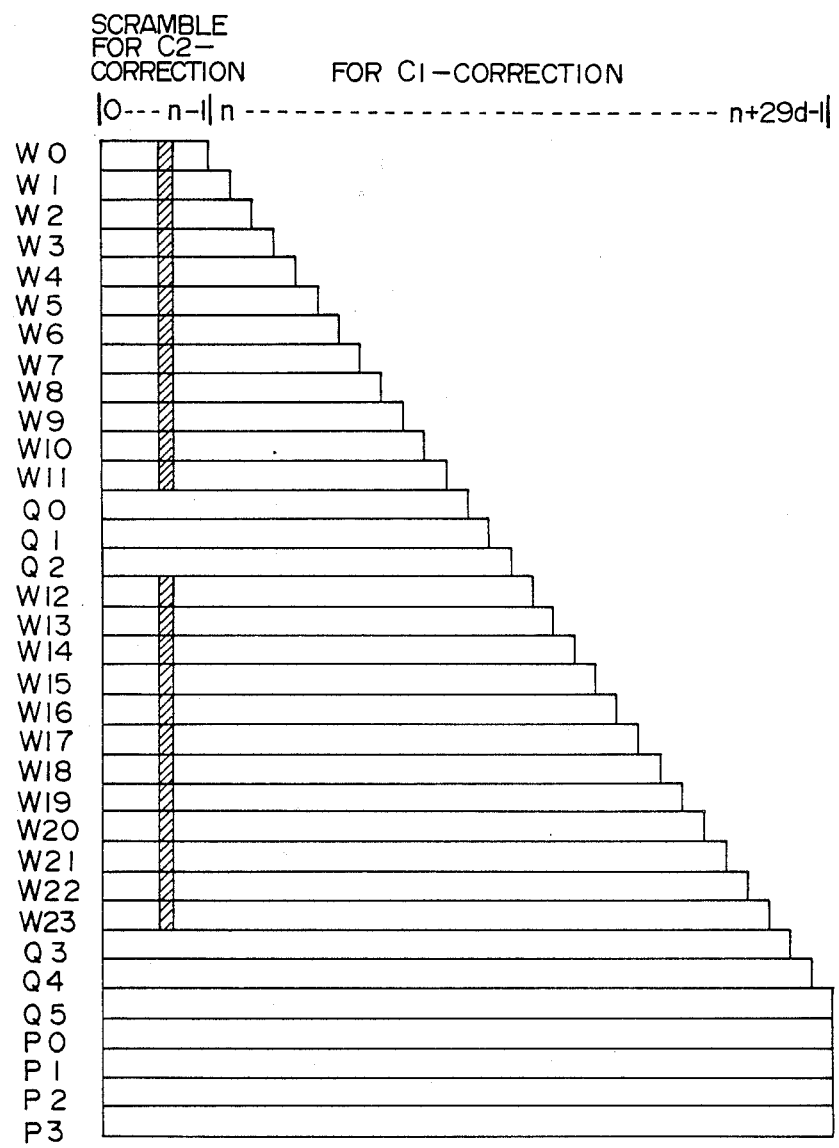
FIG. 11 is a diagram showing a memory division in the recording operation.

Let's assume that the 5-th to 38-th data illustrated in FIG. 4 are to be recorded in the memory. Further assuming that in the data region covering the 5-th to the 34-th data, the 5-th data includes n symbols, the 6-th data includes (n+d) symbols, the 7-th data includes (n+2d) symbols, and in more general terms, the i-th data includes n+(i−5)d symbols, while each of the 35-th to the 38-th data is constituted by (n+29d) symbols, then the memory is divided in the manner illustrated in FIG. 11. The decoder 17-16 generate such relative addresses that the A/D-converted audio data can be recorded in the areas $W_0$ to $W_{23}$, as indicated by hatching in FIG. 11. Parenthetically, the value of above-mentioned d is determined on the basis of the value of D described hereinbefore in conjunction with FIG. 6.

Figure 15:
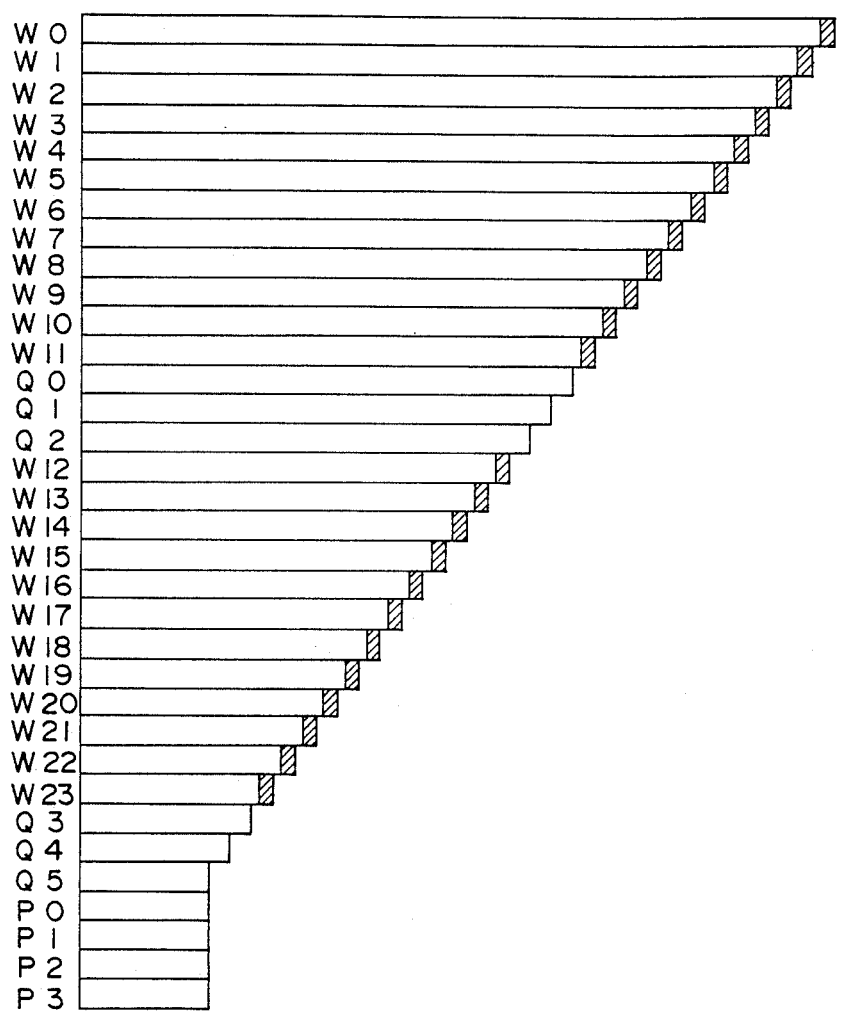
FIG. 15 is a diagram for illustrating memory division in the reproducing operation.

In reproduction, on the assumption of such memory division that the i-th data includes n+(34−i)d symbols in the data region covering the 5-th to the 34-th data with each of the 35-th to the 38-th data including n symbols, as shown in FIG. 15, the decoder for generating the relative addresses for the read-out operation is so designed to output the relative addresses corresponding, respectively, to the areas $W_0$ to $W_{23}$, as indicated by hatching. In this case, the value of d is also determined based on the value of D.

The decoder 17-12 decodes the output of a counter 17-11 for counting the audio sample number in one data field and a set of control signals 61 identifying the data field containing a greater number of audio samples and the data field containing a smaller number of audio samples to thereby produce a control signal for controlling the clock or count number produced by the block number counter 17-15 such that the data area exclusive of the audio data area is inhibited from being written with the other data than the audio data. By way of example, when the audio data of 750 samples is to be recorded in the one data field, three blocks are protected from being written with the other data than the audio data.

The block number counter 17-15 serves to count the clocks derived through a gate circuit 17-14 from the clock signal generated by the decoder 17-16 after decoding the output of the block counter 17-13 and the control output of a decoder 17-12.

The memory write-in address can be generated by adding together the relative address obtained through the decoder 17-16 and the absolute address derived by decoding the output of the block number counter 17-15 by means of the decoder 17-17.

Figure 12:
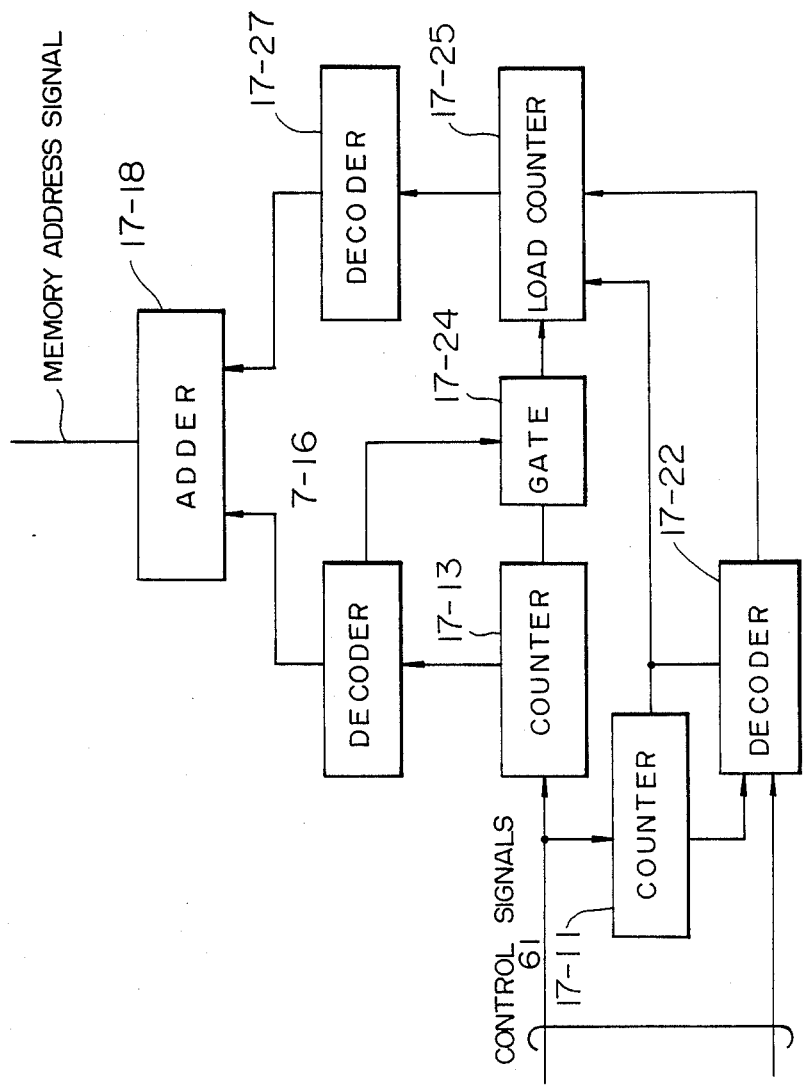
FIG. 12 is a block circuit diagram showing the write address generating circuit according to another embodiment of the invention.

FIG. 12 shows another embodiment of the write address generating circuit in which the block number counter is implemented in the form of a load counter. Referring to the figure, a decoder 17-22 decodes the output of a counter 17-11 for counting the audio sample number in one data field and control signals 61 indicating the number of the audio samples in one data field, to thereby output a count value corresponding to the load input to the block number counter 17-25 added with the number of other blocks than those for the audio data. The block number count load counter 17-25 is loaded with the count number outputted from the decoder 17-22.

Figure 13:
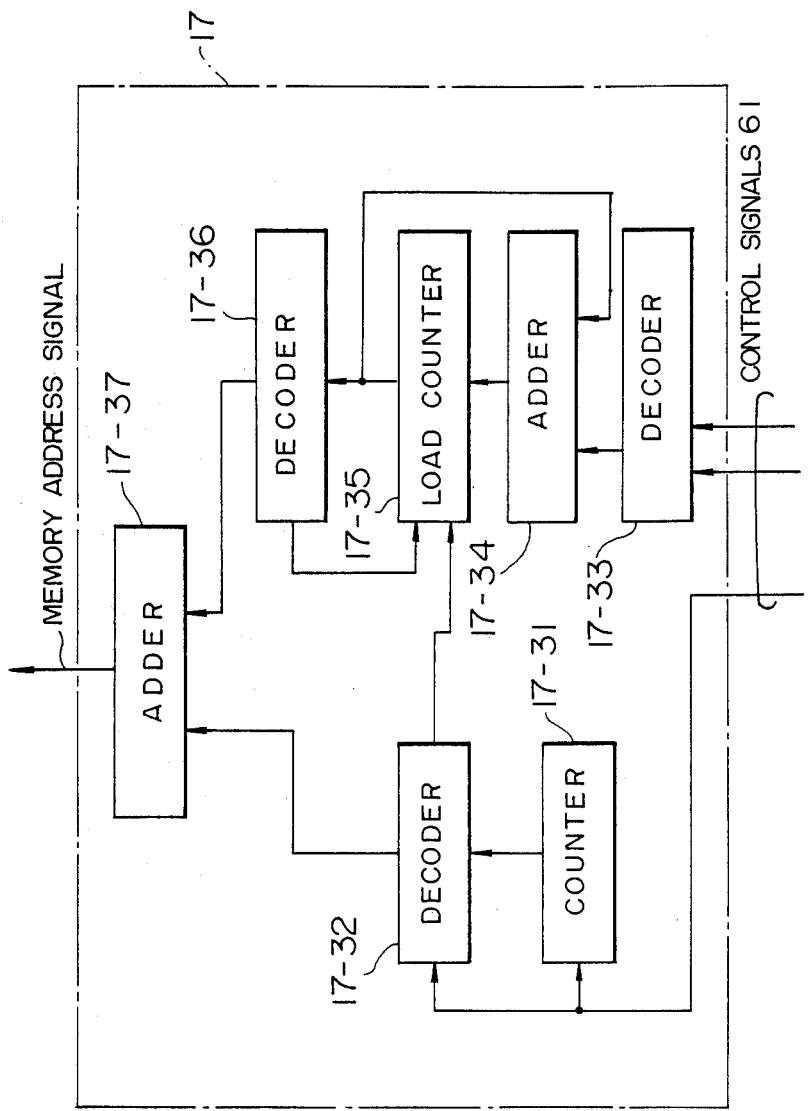
FIG. 13 is a circuit diagram showing the write address generating circuit according to still another embodiment of the invention.

FIG. 13 shows a further embodiment of the memory write address control circuit.

A decoder 17-32 including a latch circuit having an input supplied with the output of a block counter 17-31 for counting the number of data contained in one block decodes the output of that block counter 17-31 to generate the relative address for the memory and a clock signal for the block number count load counter 17-35. The output of the decoder 17-33 decoded with the aid of the control signals 61 indicating the audio sample numbers in one data field is added with the output of the block number count load counter 17-35 by an adder circuit 17-34, whereby the count value added with the number of the blocks of the data area for other than the audio data is loaded in the load counter 17-35. The adder circuit 17-37 adds the absolute address of memory generated by decoding the output of the block number count load counter 17 with the relative address outputted from the decoder 17-32, to thereby generate the memory address.

A memory map prepared through the address generating operation described above is shown in FIG. 14.

Figure 14:
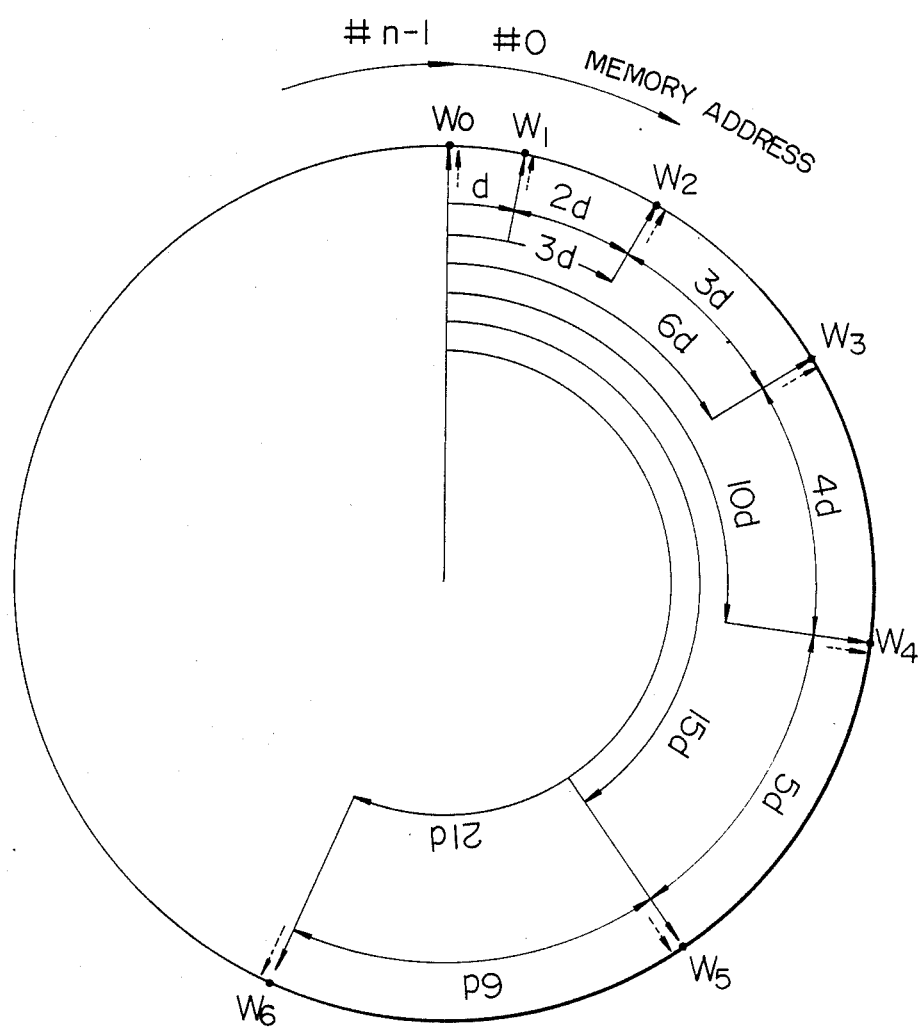
FIG. 14 is a diagram showing a memory map.

In the memory shown in FIG. 14, recording is sequentially performed at the addresses "0" to "n−1", wherein the (n−1)-th address is followed by the zero-th address, assuming that the contents as recorded is updated by new data.

Referring to FIG. 15, the addresses "0" to "n−1" of the memory are arrayed circumferentially in the order of $W_0$, $W_1$, $W_2$, $W_3$ and so forth in such a manner that the address $W_1$ is located with a distance corresponding to a number d of addresses from the address $W_0$. Similarly, the address $W_2$ is located with a distance corresponding to 2d from the address $W_1$, the address $W_3$ is located with a distance 3d from the address $W_2$, the address $W_4$ is located with a distance 4d from the address $W_3$ and so forth.

Figure 6:
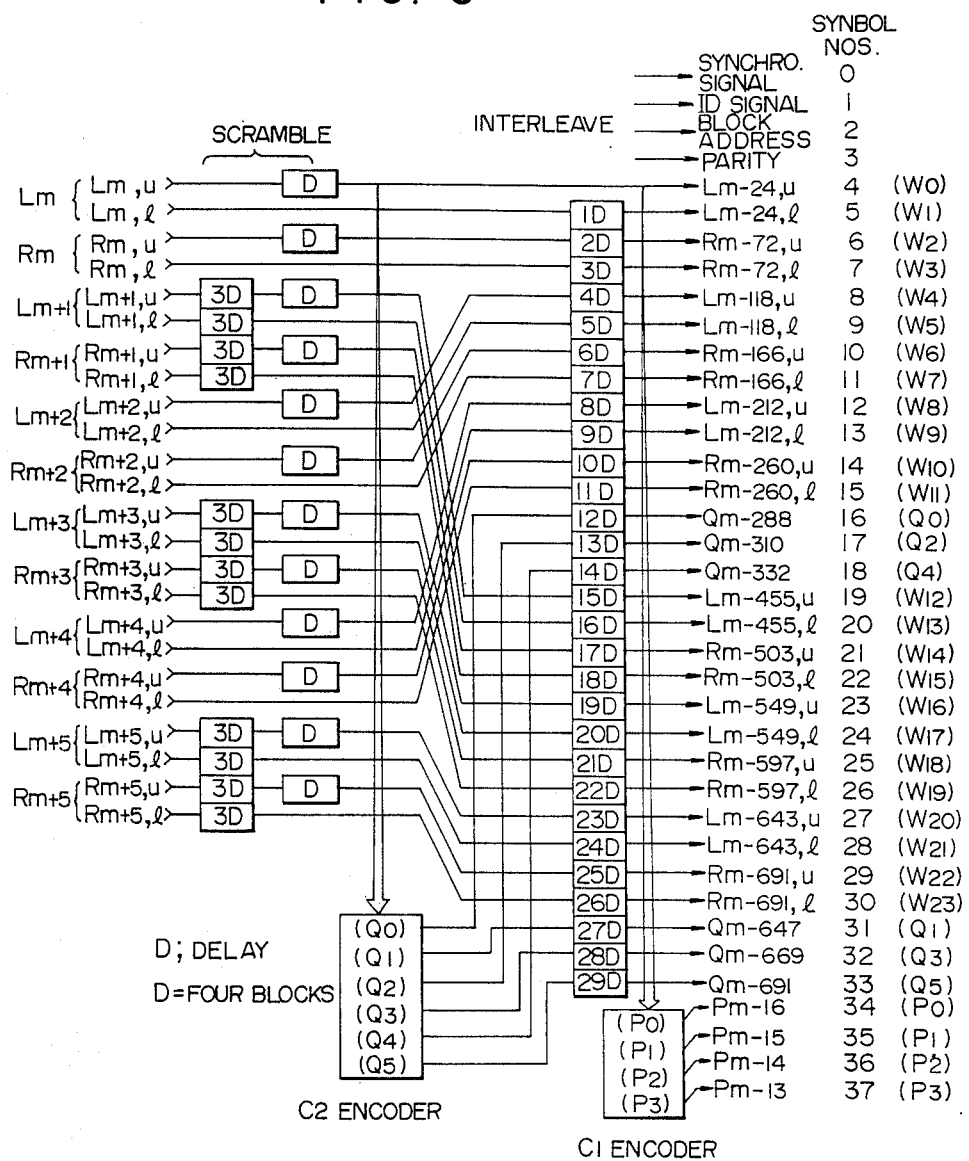
FIG. 6 is a block diagram for illustrating, by way of example, a procedure for data interleave processing.

The value of d mentioned above is determined based on the value of D described hereinbefore in conjunction with FIG. 6. The value corresponding to d is generated through cooperation of the counter 17-13 and the decoder 17-16, while the absolute address where $W_0$ is recorded is created on the basis of the outputs of the counter 17-15 and the decoder 17-17.

For performing the operation described above, the recording/reproduction processing and the circuit configuration can be simplified by controlling the dummy data on a symbol-by-symbol basis of the 24 data $W_1$ to $W_{23}$ corresponding to $W_0$.

Although the above description is directed to the recording operation, it should be understood that the address control for the output (read) operation of the audio signal to the reproducing system (e.g. to D/A converter) can be realized with the similar circuit arrangement and procedure.

As will be appreciated from the foregoing description, it is possible to record simultaneously the video signal and the audio signal in arbitrary combinations by means of a rotary magnetic head type scanner because of unnecessity for maintaining synchronization between the rotational frequency of the magnetic head scanner and the audio signal sampling frequency. To say in another way, the audio signal can be recorded asynchronously with the rotational frequency of the head scanner.

What is claimed is:

1. In a rotary-head type video recorder apparatus for recording a video signal and a digital audio signal on a recording medium by means of a rotary head controlled on the basis of said video signal,
   a method of recording input data indicative of an audio signal sampled to be a digital audio signal at a sampling frequency asynchronous with a cylinder rotation number of said rotary head, said method comprising:
   a step of detecting a difference between a rate at which the digital audio signal is recorded on the recording medium and which is determined by the video signal and a rate of the input data determined by a sampling frequency of the audio signal for a number N of samples of the digital audio signal to be included within one field period synchronized with the video signal, where N is a non-integer positive number;
   a step of setting the number of samples for the input data by preparing on the basis of the result of detection of said difference in rate at least two types of fields including a first field containing a number of samples greater than said number N within said one field period and a second field containing a number of samples smaller than said number N within said one field period;
   a block forming step of forming blocks for recording said digital audio signal on said recording medium, wherein said digital audio signal is added with a first error detection/correction code every n symbols, where n is a positive integer, for thereby forming a first code arrangement, while each of the symbols of said arrangement is imparted with amounts of delay differing from one another defined as diagonal incomplete interleave for thereby forming a second code arrangement by adding a second error detection/correction code, said second code arrangement being added with a block synchronizing signal;
   a step of setting the number of blocks to be recorded within said one field period synchronized with said video signal to a constant number of blocks capable of recording a greater number of data than said sample number N independent of said set number of samples; and
   a step of recording the block-formed data of the digital audio signal on the recording medium with the rotary head.

2. A recording method according to claim 1, wherein said recording medium is constituted by a magnetic tape, the numbers of samples in said first and second fields being selected to be even numbers, respectively.

3. A recording method according to claim 2, wherein when the number of samples in one block is given by m, the number of samples within one field is selected equal to m×a (where m represents a positive integer and a represents an integer), said field being data field having a period differing from that of said video field, the period of said data field remaining constant for the video signal in either NSTC system or CCIR system.

4. A magnetic recording apparatus of rotary-head type for recording a digital audio signal on a recording medium together with a video signal by means of a rotary head controlled on the basis of said video signal, comprising:
   detecting means for detecting a difference between a rate at which the digital audio signal is recorded on the recording medium and which is determined by the video signal and a rate of input data indicative of an audio signal sampled to be a digital audio signal at a sampling frequency asynchronous with a cylinder rotation number of the rotary head and determined by a sampling frequency of the audio signal for a number of N of samples of the digital signal to be included within one field period synchronized with the video signal, where N is a non-integer positive number;
   sampling number setting means for setting the number of field samples for the input date by preparing, on the basis of the output of said detecting means, at least two types of fields including a first field containing a number of samples greater than said sample number N within said one field period and a second field containing a number of samples smaller than said sample number N within said one field period;
   block forming means including a memory for forming blocks for recording said digital audio signal on said recording medium, said block forming means including first encoding means for adding said digital audio signal with a first error detection/correction code every n symbols, where n is a positive integer, dispersion means for dispersing data through diagonal interleave by applying amounts of delay to each symbols outputted from said first encoding means, second encoding means for adding said dispersed data with a second error detection/correction code, and means for adding the output of said second encoding means with a block synchronizing signal, the number of said blocks recorded within one field period synchronized with said video signal being a constant number capable of recording a greater number of data than said sample number independent of said sample setting means; and output means responsive to the output of said block forming means to thereby create audio information signal to be recorded on said tape; and record means including the rotary head for recording the audio information signal from the output means on the recording medium.

5. A rotary head type magnetic recording apparatus according to claim 4, wherein the numbers of samples in said first and second fields assume even numbers, respectively.

6. A rotary-head type magnetic recording apparatus according to claim 4, wherein said digital audio signal is of 16-bits two-channel signal resulted from sampling at a sampling frequency of 48 KHz with eight bits constituting one symbol, each of said blocks including one symbol, each of said blocks including 24 symbols of data for six samples of two channels, and an error correction code, wherein for one field of video signal of 525 lines/60 fields, 135 blocks are recorded, and the number of samples within one field is so selected that 810 samples are recorded in said first field with 792 samples being recorded in said second field for each channel of audio signal.

7. A rotary-head type magnetic recording apparatus according to claim 4, wherein said digital audio signal is of 16-bits two-channel signal resulted from sampling at a sampling frequency of 48 KHz with eight bits constituting one symbol, each of said blocks including one symbol, each of said blocks including 24 symbols of data for six samples of two channels, and an error correction code, wherein 8. A rotary-head type magnetic recording apparatus according to claim 6, wherein said block forming means includes means for locating said 16-bit data within one block of recording pattern.

9. A rotary-head type magnetic recording apparatus according to claim 8, further comprising a delay circuit preceding said first encoding means, and wherein said 16-bit data is located within one block by said second encoding means.

10. A digital audio signal recording and reproducing apparatus in a rotary-head type recording and reproducing system for recording and reproducing a video signal and an audio signal on and from a magnetic tape by means of the rotary head controlled on the basis of the video signal, the audio signal being sampled into a digitized audio signal as input data by a sampling frequency asynchronous with a cylinder rotation number of the rotary head comprising:

signal processing means including an encoding circuit for encoding the digitized audio signal to an error detection correction code, a dispersion circuit for dispersing said encoded data, wherein the digitized audio signal is added with a first error detection/correction code every n symbols where n is a positive integer for thereby forming a first code arrangement while each of the symbols of the arrangement is imparted with amounts of delay differing from one another defined as diagonal incomplete interleave, a block forming circuit for forming said dispersed data in blocks, a modulating circuit for modulating said block data of said audio signal, a rotary-head type scanner for one of recording and pickup of said modulated audio signal on the magnetic tape together with the video signal, and means for demodulating said modulated audio signal picked up by said scanner including interleave processing means;

field generating means including a memory for generating a block group containing a predetermined number of said blocks in the form of one field;

an address control circuit provided in association with said memory for generating two types of fields including at least a first field containing a greater number of audio signal samples than the number N of field to be included within said field period and a second field containing a smaller number of audio signal samples than said number N, where N is a non-integer positive number;

rate difference detecting circuit for detecting a difference between a rate at which said digitized audio signal is inputted and a rate at which said audio signal is recorded on said magnetic tape; and a sample number setting circuit responsive to the output of said rate difference detection circuit for controlling said address control circuit and for selecting one of said first and second fields, to thereby set a number of audio signal samples to be recorded, whereby the difference in time lag involved in reproduction processing between the video signal and the digitized audio signal is reduced.

* * * * *